(12) United States Patent
Sarhaddar et al.

(10) Patent No.: US 11,681,815 B2
(45) Date of Patent: Jun. 20, 2023

(54) SECURE TRACKING OF ITEMS UTILIZING DISTRIBUTED COMPUTING

(71) Applicant: Vault Security Systems AG, Thalwil (CH)

(72) Inventors: Arman Sarhaddar, Adliswil (CH); Martin Beyer, Seuzach (CH)

(73) Assignee: Vault Security Systems AG, Thalwil (CH)

( * ) Notice: Subject to any disclaimer, the term of this patent is extended or adjusted under 35 U.S.C. 154(b) by 172 days.

(21) Appl. No.: 17/058,174

(22) PCT Filed: Jun. 24, 2019

(86) PCT No.: PCT/IB2019/055307
§ 371 (c)(1),
(2) Date: Nov. 24, 2020

(87) PCT Pub. No.: WO2019/244139
PCT Pub. Date: Dec. 26, 2019

(65) Prior Publication Data
US 2021/0216647 A1  Jul. 15, 2021

Related U.S. Application Data

(60) Provisional application No. 62/688,544, filed on Jun. 22, 2018.

(51) Int. Cl.
*G06F 21/60* (2013.01)
*G06F 21/62* (2013.01)
*G06F 21/64* (2013.01)

(52) U.S. Cl.
CPC .......... *G06F 21/604* (2013.01); *G06F 21/602* (2013.01); *G06F 21/6218* (2013.01); *G06F 21/64* (2013.01); *G06F 2221/2141* (2013.01)

(58) Field of Classification Search
None
See application file for complete search history.

(56) References Cited

U.S. PATENT DOCUMENTS

| | | | |
|---|---|---|---|
| 9,635,000 B1 | 4/2017 | Muftic | |
| 10,755,327 B2 | 8/2020 | Nagla et al. | |
| 2013/0135105 A1 | 5/2013 | Man | |
| 2015/0379510 A1 | 12/2015 | Smith | |
| 2016/0098723 A1 | 4/2016 | Feeney | |
| 2016/0239733 A1* | 8/2016 | Hertz | H04W 4/029 |
| 2016/0300234 A1* | 10/2016 | Moss-Pultz | G06Q 20/3829 |
| 2017/0048216 A1* | 2/2017 | Chow | G06Q 40/08 |
| 2018/0018723 A1* | 1/2018 | Nagla | H04L 63/08 |

FOREIGN PATENT DOCUMENTS

| EP | 2504823 B1 | 10/2014 |
|---|---|---|
| WO | 2019244139 A1 | 12/2019 |

* cited by examiner

*Primary Examiner* — Brandon Hoffman
(74) *Attorney, Agent, or Firm* — Brian Roffe

(57) ABSTRACT

A computerized method of the invention includes software having instructions loaded on a computer system including a database populated with item information associated with owner, leasee and/or lien holder information. The CPU executes the instructions for, in a first step, registering user, in a second step, associating items and, in a third step, making registered item information available for updating and interrogation by users with the requisite permissions.

18 Claims, 10 Drawing Sheets

SECURE TRACKING OF ITEMS UTILIZING DISTRIBUTED COMPUTING

CROSS REFERENCE TO RELATED APPLICATIONS

This application is a National Stage application of a PCT application claiming priority to Provisional Patent Application No. 62/688,544, filed Jun. 22, 2018, entitled SECURE TRACKING OF ITEMS UTILIZING DISTRIBUTED COMPUTING, the content of which is incorporated by reference hereto and relied upon.

FIELD OF THE INVENTION

This disclosure relates generally a system and method for tracking items utilizing distributed computing.

BACKGROUND OF THE INVENTION

Systems exist for tracking items which uses computers. For example, tracking of animals through the stages of their development, for monitoring their health and migration usually involves attaching a radio transmitter to the animal, the signals of which can be picked up and triangulation methods can be applied for localizing the animal.

In addition, systems exist for validating identity using block chain technology. For example, U.S. Pat. No. 9,635,000, the content of which is incorporated by reference herein and relied upon, describes such a prior art system. This system however only deals with information about entities, for identification purposes. In particular, this prior art system manages identities of entities in a computer network made up of a plurality of computing devices in the networked together, each computing device being associated with at least one entity. An electronic append-only public identities ledger maintained simultaneously at more than one of the plurality of computing devices, the electronic append-only public identities ledger being made up of a plurality of cryptographically-encapsulated identity objects that each uniquely identify a respective entity within the computer network. Each of the plurality of cryptographically-encapsulated identity has (1) one or more identification attributes that uniquely identify a first entity associated with the respective cryptographically-encapsulated identity object, the one or more identification attributes being self-enveloped via a public cryptographic key of the first entity; and (2) one or more validation attributes created by a second entity associated with a separate cryptographically-encapsulated identity object, wherein the one or more validation attributes are used to validate that the one or more identification attributes accurately identify the first entity. In this method, upon respective validation, each of the plurality of cryptographically-encapsulated identity objects are structured in a linked list and maintained simultaneously at at least a first computing device associated with the first entity and a second computing device associated with the second entity.

It is essentially impossible to track lost or stolen items without using costly GPS signal transmitters attached to the stolen or lost item.

What is needed is a secure manner in which one can track lost or stolen items using a centralized searchable database to find items which have been reported stolen while incentivizing finders of items to report found items and be rewarded.

Still further, what is needed is a system for storing item data which can be kept private by a user and, in a centralized and secure way, allowing the item data to be released so as to be publicly searchable after the item has been reported stolen by the user.

SUMMARY OF THE INVENTION

A system and method utilizes a block chain and a secure registered item database to securely register and track items with item information registered in the registered item database, such registered item information selected from one of the group of information consisting of identification information, warranty information, ownership information, proof of ownership, lost and found status together with reward information, recall status, maintenance history, end of life information, serial number, manufacture information, product description, item location, and lien information. As used herein, an item or asset is typically a physical item (e.g. wristwatch, jewelry, hardware, artwork, musical instrument, etc.).

A computerized method of the invention includes software having instructions loaded on a computer system including a database populated with item information associated with owner, leasee and/or lien holder information. The CPU executes the instructions for, in a first step, registering user, in a second step, associating items and, in a third step, making registered item information available for updating and interrogation by users with the requisite permissions.

It is an object of the invention to provide a system that allows one to register an item in a convenient and secure manner such that it can be identified in the event it is lost or stolen and then found.

It is an object of the invention to provide a system that enables ready scanning of items to determine whether an item has been misplaced or stolen.

It is an object of the invention to provide incentive to those who have found a registered item to return the item to its rightful owner.

It is an object of the invention to provide a system for conveniently labeling product for ease of subsequent identification or tracking.

It is an object of the invention to thwart fraud.

It is an object of the invention to provide a convenient means to record ownership changes such that there is more confidence that the seller has the right to sell an item.

It is an object of the invention to control dangerous devices when a device is reported lost or stolen.

It is an object of the invention to provide a system that allows items to be tracked, and their status updated through their life cycle.

It is an object of the invention to provide a system that allows a purchaser of an item to have confidence that the item is not a counterfeit.

BRIEF DESCRIPTION OF THE DRAWINGS

This disclosure is further described in the detailed description that follows, with reference to the drawings, in which.

DETAILED DESCRIPTION OF THE INVENTION

Figure 1:
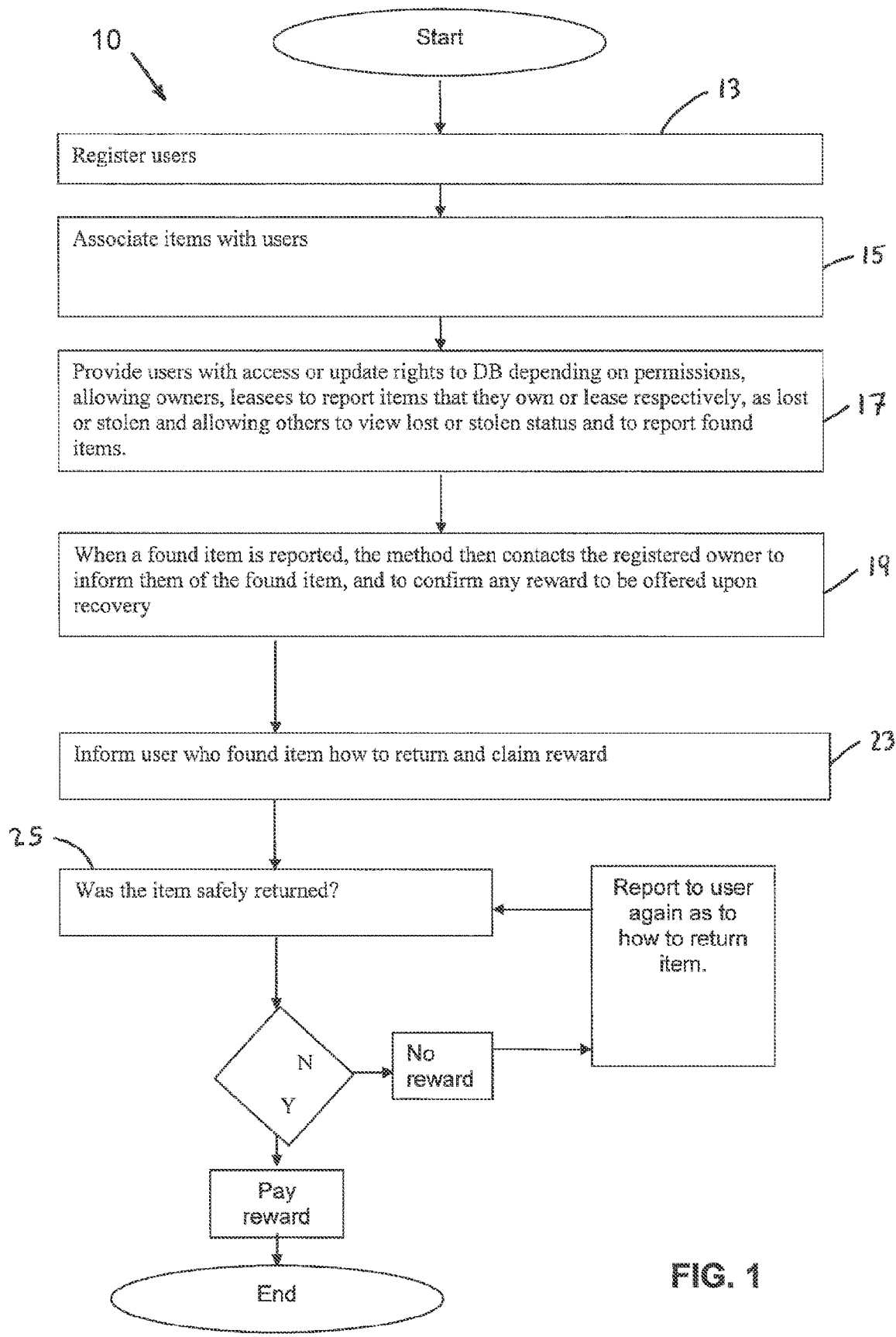
FIG. 1 is a block diagram of the method of the invention.
Figure 2:
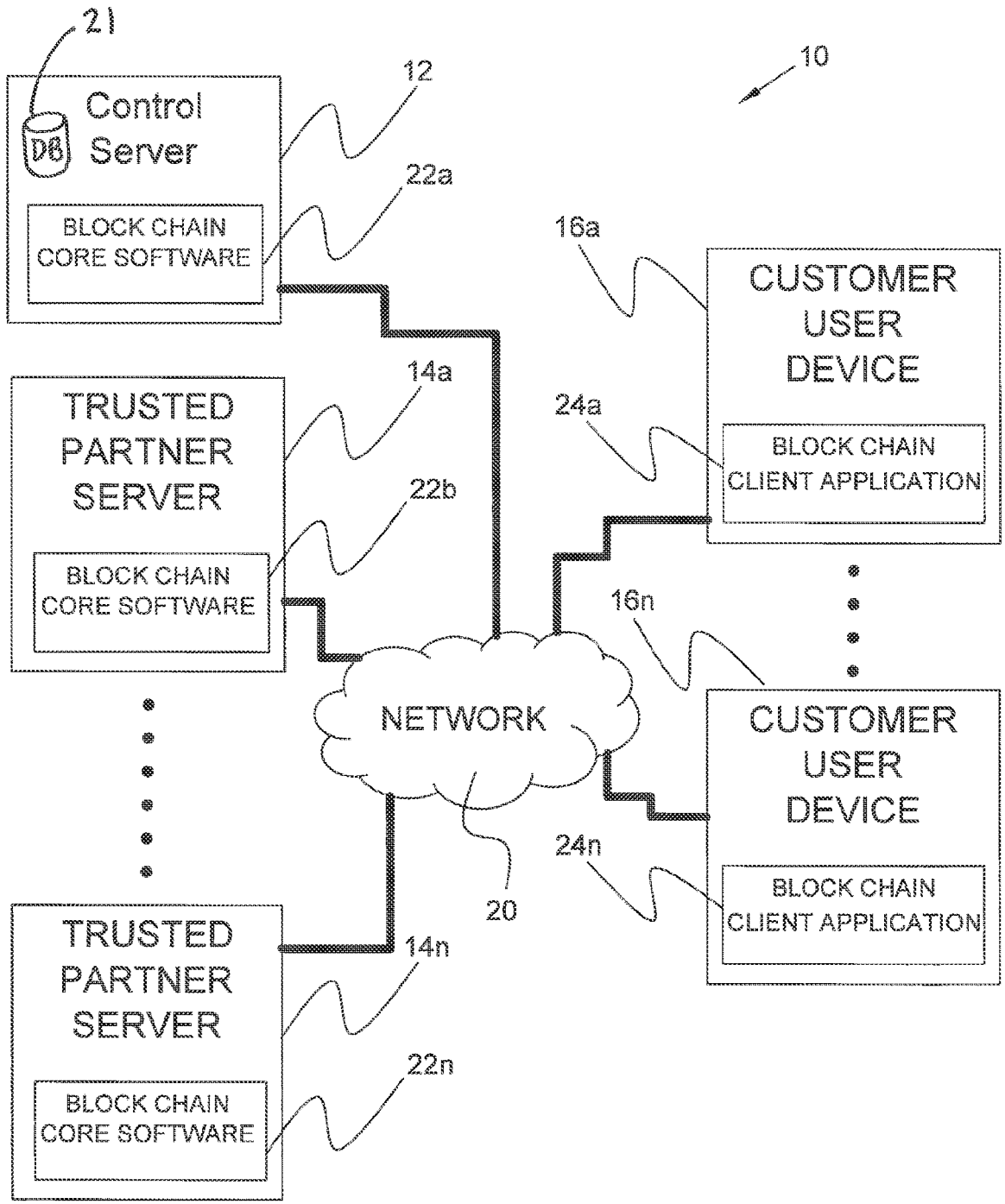
FIG. 2 is a trust-enabled decentralized system to register and track items using a block chain, according to an exemplary embodiment.

Referring now to FIGS. 1 and 2, the invention provides a trusted-enabled decentralized asset tracking system 11 and method 10 that utilizes a public ledger mechanism such as a block chain 22a-22n to securely register and track items with ownership information. A block chain 22a-22n is a public ledger mechanism, and as used herein, it serves as an ownership record for each registered asset. A block chain is also a distributed system, utilizing cryptographic methods to ensure the security of information embedded within the block chain and immutability of the records. In an exemplary embodiment, the block chain configuration used in accordance with the present system 11 is a partially private permissioned block chain with encrypted data blocks containing, for example, ownership and asset registration information.

The computerized method 10 of the invention includes software having instructions for executing the method. The instructions are loaded on a computer system having functional components such as a CPU, memory including a database 21 to be populated with item information associated with owner, leasee and/or lien holder information, and communications interfaces for operably interconnecting the functional components. The CPU executes the instructions for, in a first step 13, registering user, in a second step 15, associating items with registered users and, in a third step 17, makes registered item information available for updating and interrogation by users with the requisite permissions. In the first step 13, the method 10 registers users as owners, leasees and/or lien holders, optionally registering members of the general public with limited access rights to the item information database. The item is preferably a physical item selected from one of the group of physical items consisting of wristwatches, jewelry, hardware, artworks, musical instruments, and other things such as motor vehicles. In the second step 15, the method 10 associates an item with registered users and populates the database 21, typically a multi-tenant database, with item information in association with registered users such users being classified according to one of a group of classifications consisting of at least owners, leasees and lien holders and stores such registration information on the database including information stored on the distributed ledger. The distributed ledger is a block chain 22a-22n (designated 22a to 22n to represent each instance) selected from one of the list of block chains consisting of the ETHEREUM™ block chain, the HYPERLEDGER™ block chain, HYPERLEDGER FABRIC™ block chain, a public block chain, a private block chain, a federated block chain, a permissioned block chain, and an unpermissioned block chain.

This item information includes at least stolen status, lost and found status together with any reward information. In the third step 13, the method 10 makes the registered item information available for updating or interrogation by users based on permissions. Additional item information may be stored in association with the item, such as identification information, warranty information, ownership information, proof of ownership, recall status, maintenance history, end of life information, serial number, manufacture information, product description, item location, and lien information may be stored in association with the item by a user with the associated permissions.

The method 10 allows owners and leasees of items, when an associated menu selection is made, to search the database 21 for an item lost or stolen and report the item as lost or stolen while other users have permission to view basic item information such as the lost, stolen or lien status of the item, and to report found items. In a fourth step When a found item is reported, the method 10 then contacts the registered owner to inform them of the found item, and to confirm any reward to be offered upon recovery. In a fifth step 23, if a reward is confirmed, then the user is informed as to how to return the item and also informed of the reward to be provided upon safe return. In a sixth step 25, the method 10 queries the owner to confirm return of the item. If not, the method 10 reports to the user who reported the item found, how to return and collect the reward. Only if the owner confirms the return of the item is the reporting user paid the reward.

When an item is reported as lost or stolen by the registered item owner, in a further optional step, the method 10 enables uploading of or enables associating the report with a police report or police file number.

The method 10 further allows connection to and query of the database 21 by a user based on the access rights of the user or user classification. If the user is classified as a member of the public with no superior use privileges, the method 10 provides an interface to the user allowing the user to interrogate the status of an item in a limited way so as to allow the user to at least determine the lost, stolen or lien status of an item. If the user is classified as having superior permissions, such as an owner, leasee or lien holder, the method allows the user to access the item information and to register an item as lost, found, encumbered, or stolen according to his permissions.

Access rights are determined by an ID protocol based on a query, rules and the known item status. The ID protocol checks the user's account to see if items are registered as being owned by the user and if so, provides the user with access to an account manager interface allowing the user to manage (i.e., update or edit) the items in their account.

The method 10 includes the further step of allowing users with the necessary permissions to search for and identify an item using a mobile device or any other computer system by entering certain search parameters such as type, brand, serial number, QR code and more in order to verify an item status as "good", "lost" or "stolen". The method 10 further allows a user with required permissions to change an item status to "repair/maintenance", "end of life", "defect", or "destroyed" (more detail on this feature is provided below under an associated heading).

Data in the database 21 is optionally stored on the cloud. The data may also be stored on a side chain.

Structurally, the system 11 of the invention includes at least one control server 12 (although it may include a plurality of control servers), one or more trusted partner servers 14a-14h, and one or more customer user devices 16a-16n.

The components of the system 11 are connected via a network 20, optionally any combination of local area networks and wide area networks which communicate typically over TCP/IP. The at least one control server 12 as well as any trusted partner servers 14a-14h run instances of software enabling the distributed ledger block chain for secure data storage.

While a single control server 12 is shown, this is by way of example and should be understood that there may be a plurality of control servers 12. Communication among these elements is by way of the network 20. Network 20 may be any combination of local area networks and wide area networks which communicate typically over TCP/IP. The control server 12 and trusted partner servers 14a-14h run instances of block chain core software 22a-22n. An instance of software is a specific realization of a software object. An object may be varied in a number of ways. Each realized variation of that object is an instance. Each time the software of the invention is run, it is an instance of the program. In an exemplary embodiment, the block chain utilizes the ETHEREUM™ block chain, but other block chain implementations, such as HYPERLEDGER™, HYPERLEDGER FABRIC™, public or private block chain, Federated block chain, permissioned or unpermissioned block chain. Other block chain variants may be alternatively be used.

The instances of the block chain core software 22a-22n enable different entities to have access and control of a block chain that stores data that includes asset registration information.

User Registration

User registers himself to the system 11 of the invention by email and password. ID verification protocols are followed to verify the ID of the registrant.

Item or Asset Registration

Figure 3:
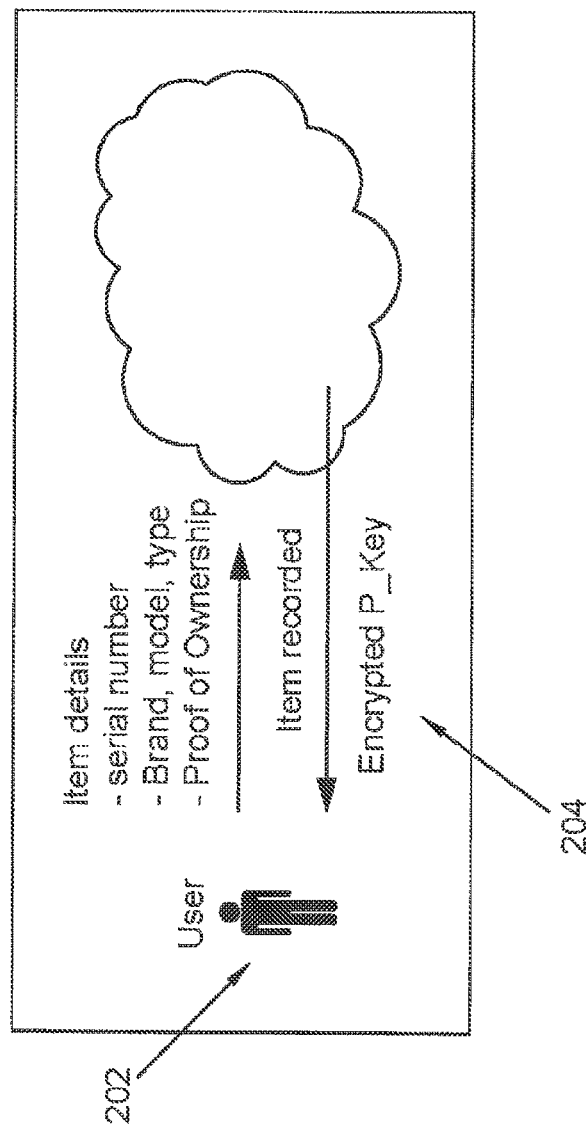
FIG. 3 is a schematic diagram illustrating the process of registering an asset.

Referring now to FIG. 3, the user 202 registers a new item by unique identifiers (i.e. serial number, photo, invoice, certificate any other proofs of ownership). Optionally, in particular for certain items of high value such as a luxury watch or a car, the system 11 of the invention back-checks the item ID with the manufacturer by communicatively connecting with a server hosting a verification service operated by the manufacturer, sending the product serial number to the server of verification service, interrogates the verification service using validation algorithms (such as, on the manufacturer's side, comparing the serial number information, the IP from which the interrogation was made with the location of serial numbers of product sent to stores in the area of the interrogator as estimated from the IP address). Once validated as described in the foregoing, the verification service module of the manufacturer registers the asset sending the User 202 an encrypted private key P Key 204 over the network which the User is encouraged to store locally as a digital confirmation of the item's registration onto the block chain. The P Key 204 is, for example, a digital invoice containing all the relevant information about the asset. In one sense, the P Key is comparable to a receipt one receives after paying for an item in a store but includes much more information than the price (e.g., it includes ownership information, and perhaps also warranty information, etc.). Using the system 11 of the invention, once the previous owner (user A. 702, see FIG. 9) communicatively connects via the network, he is provided with a menu tab, hyperlinked text or popup or the like, that allows the user to select what they would like to have done. If the user selects "ownership change", the system interrogates the user asking him to provide inputs such as new owner details, the sales price, etc., as well as his P Key and allows him to submit the same to the server of the invention to record an ownership transfer to the new owner 704. Once this is executed, the system marks the "digital invoice" invalid, and flags it against re-use. The system then issues a new one with the new owner's details overwriting the previous owner's details.

Figure 4:
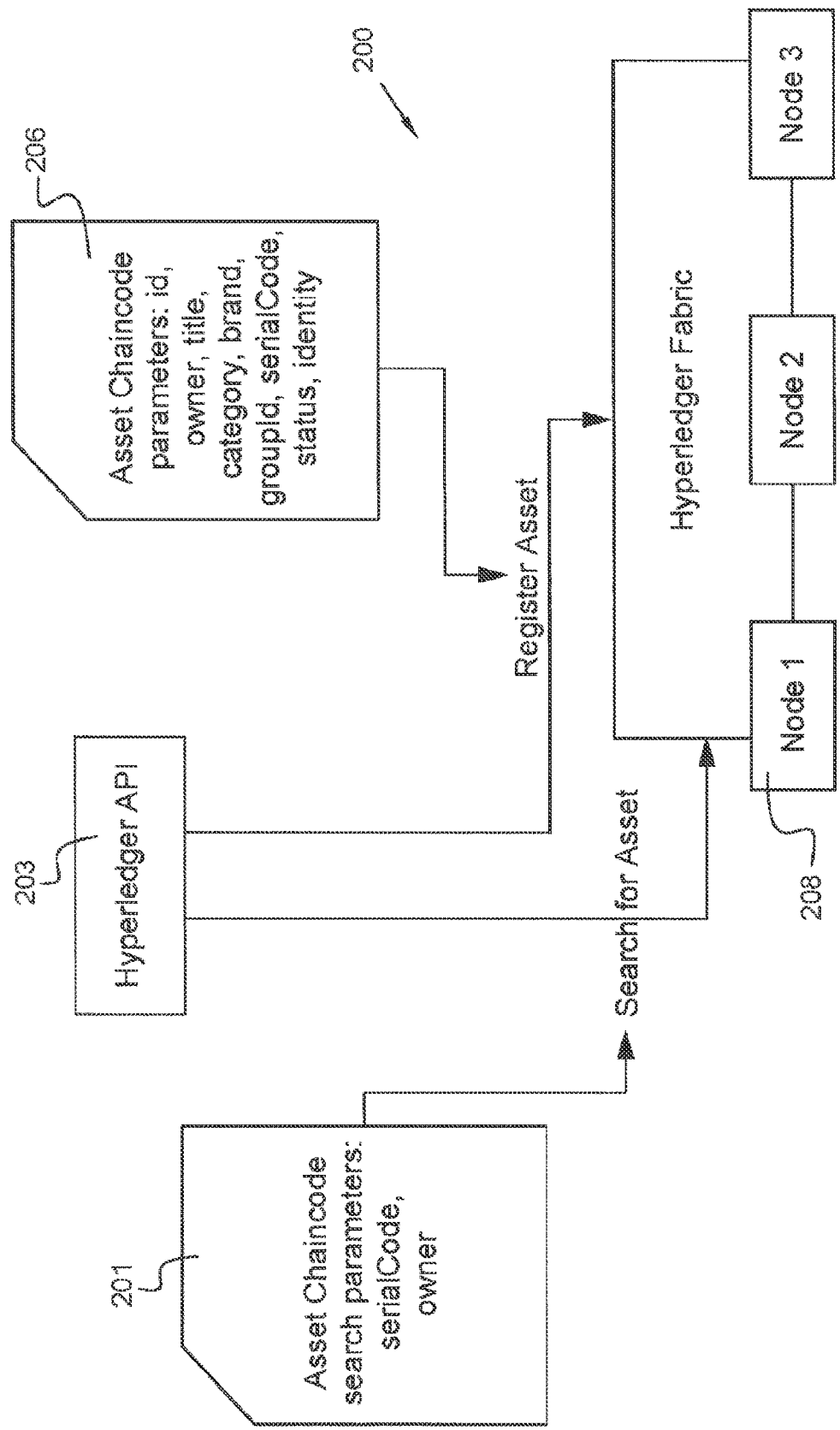
FIG. 4 is a block diagram of search and registration of an asset using the invention.

Referring now to FIG. 4, a logic flow diagram 200 of the invention shows the basic workflow of the invention. In block 201, the asset chaincode search parameters (for example, ID, owner identifying data, title, category, brand, groupid, serialCode, status, and identity) are entered by the user seeking an asset. Chaincode is a piece of code that is written in one of the supported languages such as Go or Java. It is installed and instantiated through an SDK or CLI onto a network of Hyperledger Fabric peer nodes, enabling interaction with that network's shared ledger. A block chain API 203 (such as the Hyperledger API, or the APIs of any other comparable block chain such as those listed in the instant application) is used to specify how software components of the Hyperledger (or other block chain) and the software of the invention should interact. For example, when an asset (or more accurately, the indices of an asset) is searched using the software of the invention, the Hyperledger API 204 defines how the software of the invention executes the asset search, and how to register an asset as well. Such asset registration step includes registering inputs specified in block 206 such as the owner or the manufacturer registering the asset using parameters such as ID, owner identifying data, title, category, brand, groupid, serialCode (i.e., serial number or ID number), status, and identity. The registration data may then be stored on a specified node 208 of a public or other type of block chain.

Optionally, if a digital key of any sort was provided at purchase, via email for example, it can be converted into an encrypted P K and used to unlock the manufacturer's own registration system (which may be stored using a multi-tenant database having encrypted private virtual tables of data). In one embodiment, the digital key is provided by the vendor upon sale of an item online as part of the purchase. Note that until the key is used by the buyer to register the item, it can be used by anyone to register the item in their name. Therefore, the purchased item together with the digital key is preferably provided at the time of purchase or gifting an item to a third party.

It should be noted that a digital key may be used to record status changes in an item, for example, the possession of a rental car.

Referring again to FIG. 2, the customer user devices 16a-16h run a block chain client application 24a-24n (designated 24a to 24n to represent each instance). The block chain client application 24a-24n allows a user to upload information about an asset to the block chain for which the asset information is only accessible and readable to the user. Examples of information that can be input for an asset can be category, groupid, serialCode, status, identity, brand, serial number, description, ownership information, location, lien information, proof of ownership and other such desirable information. In an exemplary embodiment, the block chain client application 24-24n can run as a software application available as a downloadable application for mobile devices, or via an accessible website to provide multiple access point options for a particular user. Different levels of permissions for access to sub-portions of data can be utilized, as desired, based on the portion of the system 11 accessing the data.

Item Repair or Maintenance

The user's changing status of an item which he has permission to change status to "item repair or maintenance" is similar to "Status Change" adding the option to record "repair" or "maintenance" of an item and eventually other characteristics which are relevant. P Key or comparable digital key is always required.

Item "End of Life" or "Defect" or "Destruction"

The method 10 of the invention includes this option by a separate and final status change in case an item has to be deleted from the system due to "end of life" or other reasons.

After confirmation, the P Key becomes invalid and is not usable anymore. The item will be de-registered within the invention's database. This prevents a counterfeit replacing the end of life item from going into circulation.

The block chain 22a-22n used with the invention typically has multiple layers of permissions, created and controlled by a user. The permission layers allow for private information to remain private until either a user of other permissioned entity seeks access to this information, for example, he or she wishes to report the particular asset as stolen or lost, or wishes to take inventory of the registered information. Once an asset is reported lost or stolen, the control server 12 enables key asset information to be searched and published to a user using a search engine 26 (shown in FIGS. 6, 7 and 8) to allow items to be searched and located within the system 11.

Lost or Stolen Item

Figure 5:
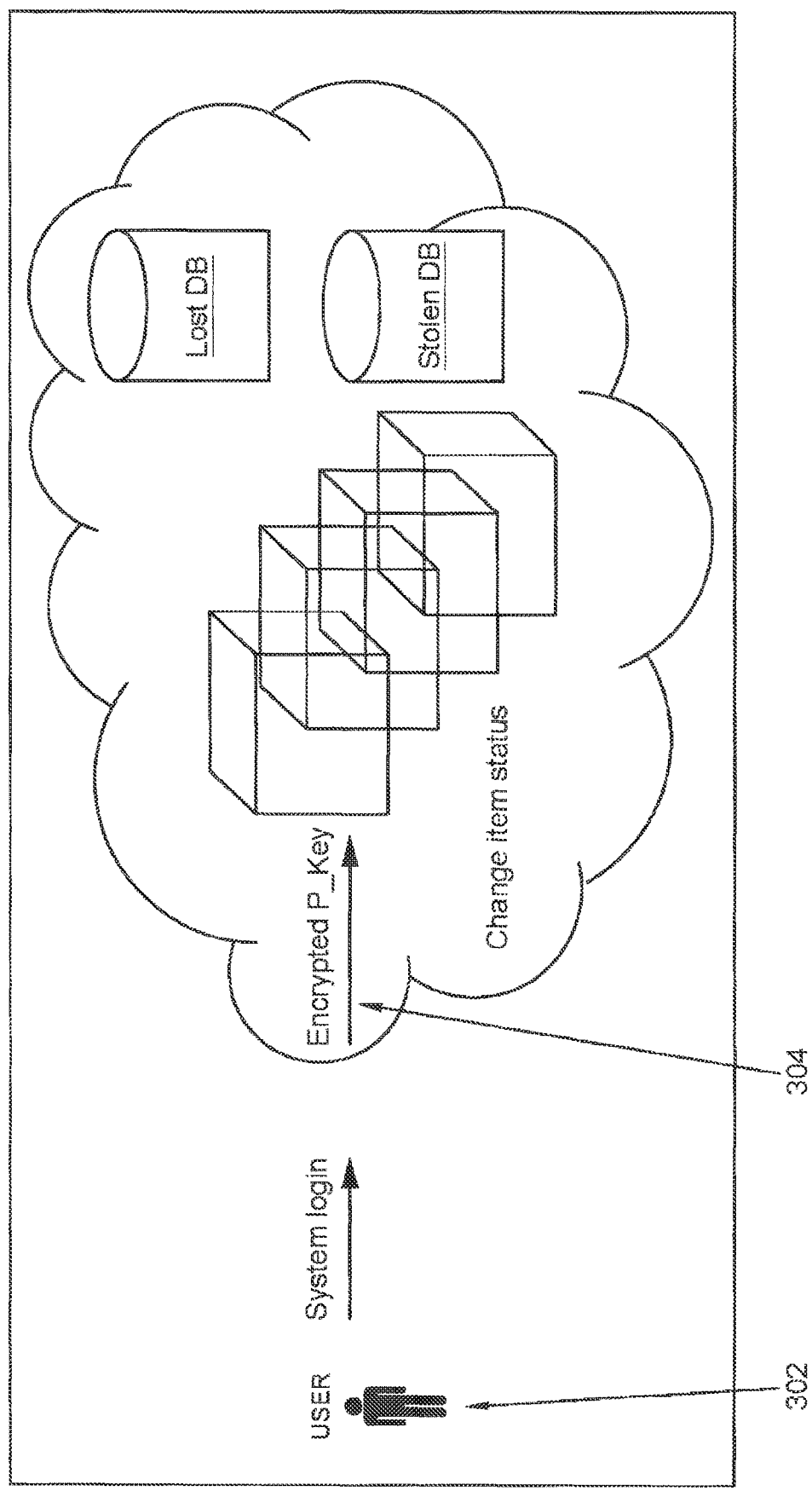
FIG. 5 is a schematic diagram of a lost or stolen item workflow.

Referring now to FIG. 5, reporting a loss of an item or a stolen one will be accomplished via a status change recorded in a column of the database of the invention.

The user 302 has to login with his credentials, and to change the item's status from "ok" to "lost/stolen", the P Key 304 being required. After confirmation, the item will be set to the new status and filed into the appropriate block chain database (either lost or stolen) for faster tracing. The status of the user 302 must be active owner in order to change the status of the item. Consequently, the system checks the user status to confirm the "current owner" status before allowing the change.

Search Item

Figure 6:
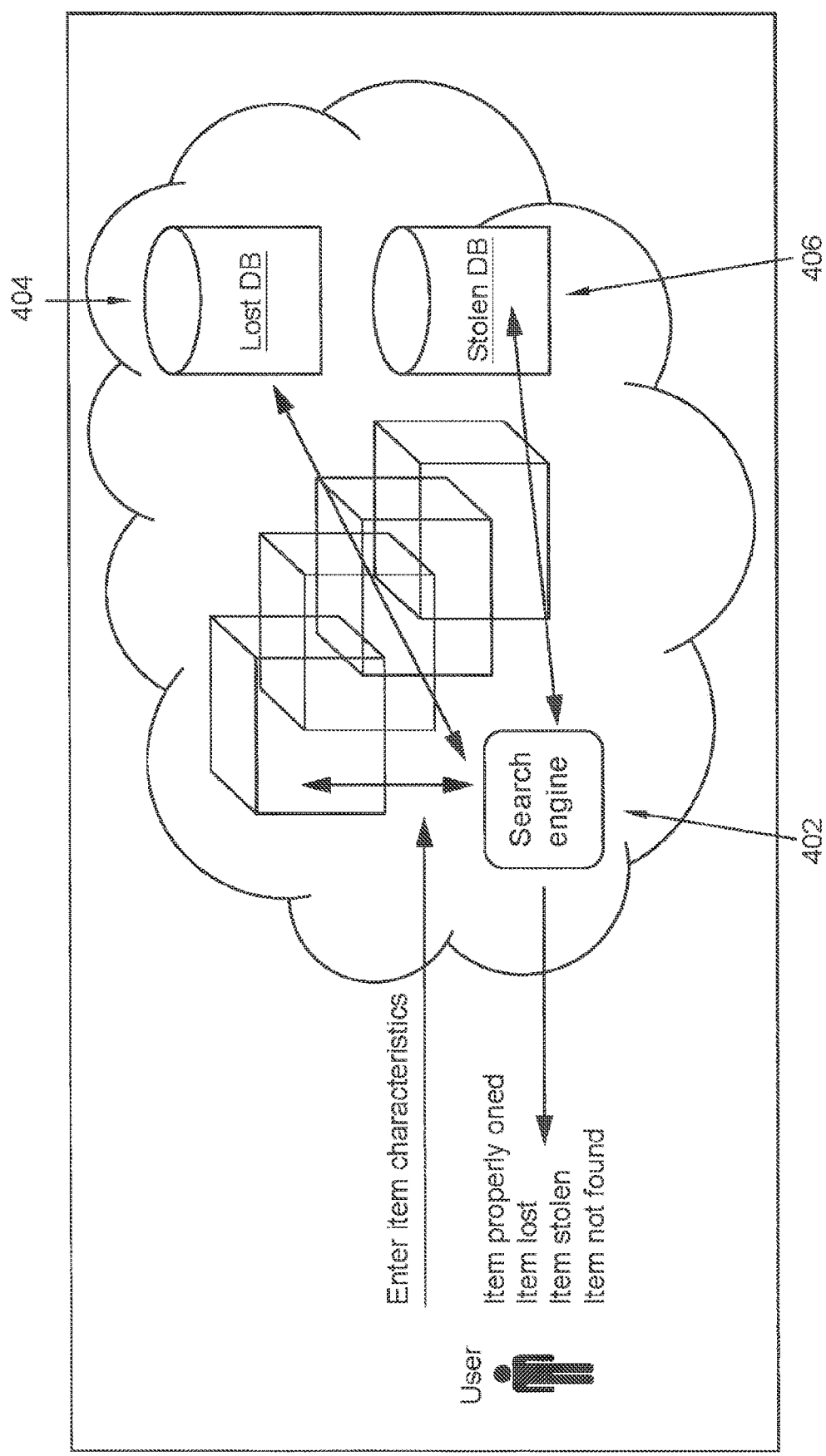
FIG. 6 is a schematic diagram illustrating the search function of the invention.

Referring now to FIG. 6, the invention includes an optional cloud based search engine 402 accessible from any networked computer system including mobile devices in order to enter item specific identifiers.

Based on the input, the search engine 402 searches the appropriate databases 404, 406 for potential matches. The results can show the following status:
1. Item properly owned and registered
2. Item lost
3. Item stolen
4. Item not found
5. Item is a counterfeit
6. Item recalled
7. Item under maintenance
8. Item rented and in possession of X person.

The system 11 of the invention includes key tools that enable the practical operation of the registration system of the invention. For example, registration is made based on information encoded on the object, preferably in a more or less indelible form. Typically, this is done by the manufacturer themselves for items of more than minimal value. At one level, the manufacturer simply marks each product, optionally with a hologram, with a serial number that serves as a key to unlock product information on the manufacturer's own server when the user registers on the product with the manufacturer, typically performed online. Many electronic gadgets with known brand names are already marked with a unique serial number that sufficiently identify that particular produce and so nothing systematically must be altered here. The serial number and the manufacturer is registered by each owner. For goods with a potentially high value (a LOUIS VUITTON® bag for example), RFID chips, typically passive chips, may be embedded in the product itself. A suitable RFID reader activates these chips by energizing them so as to force them to transmit their ID numbers. The reader has a receiver which reads this number and can either display the number or transmit the serial number information to a user app which can process this information according to the intentions of the user.

An ID and registration station of the invention, located in modern shopping malls or department stores, typically located with or integrated into self-service checkout stations, uses optical shape recognition technology to identify where the unique serial number is located on any product having label location information registered with the system 11 of the invention. This same station may be provided with an RFID reader for reading the identification information on the device is stored on an RFID chip embedded in the device. Ownership registration can be made via this same registration station, particularly useful for items intended as gifts as the purchaser can register the intended recipient of the gift as the first owner, thereby allowing him or her to return the product without hassles. Obviously, ownership registration is only permitted once payment for the item has been made. A portable such station, particularly for buyers who frequently purchase items, even second hand items, may be placed at a variety of different locations. Such a device allows the verification of the authenticity of the goods, whether the goods status is clear (i.e., not indicated as lost or stolen), etc.

For example, a seller of an item may sell to someone who does not register their ownership of an item initially registered by the first owner. When the item has significant value (whether actual or sentimental), the seller might later report the item stolen and so seek to recover the item, even when he or she was duly paid for it. To avoid this problem, the system 11 imposes rules on all users via terms of service or use upon registration. Such rules revert to ages old principles of law. For example, "possession is 9/10ths of the law", meaning that the person who possesses an item is assumed to be the owner or the person who possesses an item for a long enough time, gains a right of adverse possession against the former owner. Some rules are dependent on the class of user and optionally their reputation, trustworthiness and reliability. In one embodiment, users may be limited to a certain number of reported losses per year, depending on their class (reputation, trustworthiness or reliability). For users of the "manufacturer" class, for example, many more theft complaints may be allowed. For individual users, much fewer. Depending on the level of trust of each user, they may be allowed more yearly complaints or their explanations of events may be given more credibility.

Of course, where a theft has been reported using the system 11 of the invention, the system should not simply make information about all subsequent registrations available to the person asserting that a theft has taken place. A counter-attack of a buyer could be that they registered their purchase with the system of the invention a period of time in the past sufficient to allow the system to suppose that the purchaser is the true owner. This places the burden of reporting the theft on the shoulders of the person claiming theft, assuming that one of the rules is that a theft has to be reported no more than say 5 days after the date the theft is claimed to have taken place and that the person currently in possession must not have registered ownership before the claimed date of theft. The system 11 of the invention triggers and/or to prevents actions (such as the report of a theft) when the delay in reporting is unreasonable, and so clearly motivate the rapid registration of valuable goods.

Where liens are recorded with respect to the items (for example a car for which a loan was obtained for its purchase, the system 11 of the invention will not allow a transfer without the lien holder being informed at least by email of the requested transaction and who approves of such transaction which the lien holder would do if the lien has been paid off or where the lending entity accepts that the new owner overtakes responsibility for repayment of the loan.

In order to register possession automatically, a user who fails to register their ownership within a set number of days after purchase may use an inventory reading device of the invention which is essentially a wide area RFID reader (WA RFID reader). This WA RFID reader, which can be part of a standard IoT installation in a home or office, periodically interrogates the items that include a passive RFID device in a room and automatically records detected numbers and associates these with a user's ownership of those items (they at least indicate his possession of such items). Of course, to be effective, the transmitted information must also include at least the brand and serial number (or a single number embedding at least these two bits of information). Such a system can also inform the owner of when an item is missing from a particular location, in order to identify theft early. Upon registration with the system 11 of the invention, each user agrees to terms of use and service which define how long a user can be in possession of an item for it to be considered their own property (adverse possession) and not subject to return to the prior registered owner. During the time that the item is not yet owned long enough to be considered owned by adverse possession, this broadcast information is available for searching by the registered owner, thus fulfilling a requirement of "open and notorious" possession of the law of adverse possession.

The scanner of the invention can be particularly useful by police in locating stolen property. They need only scan and such information is available for searching by the registered owners.

The scanner of the invention can also be used by customs officials in identifying counterfeit items whose ID does not correspond to the IDs registered with the manufacturer's database.

Figure 7:
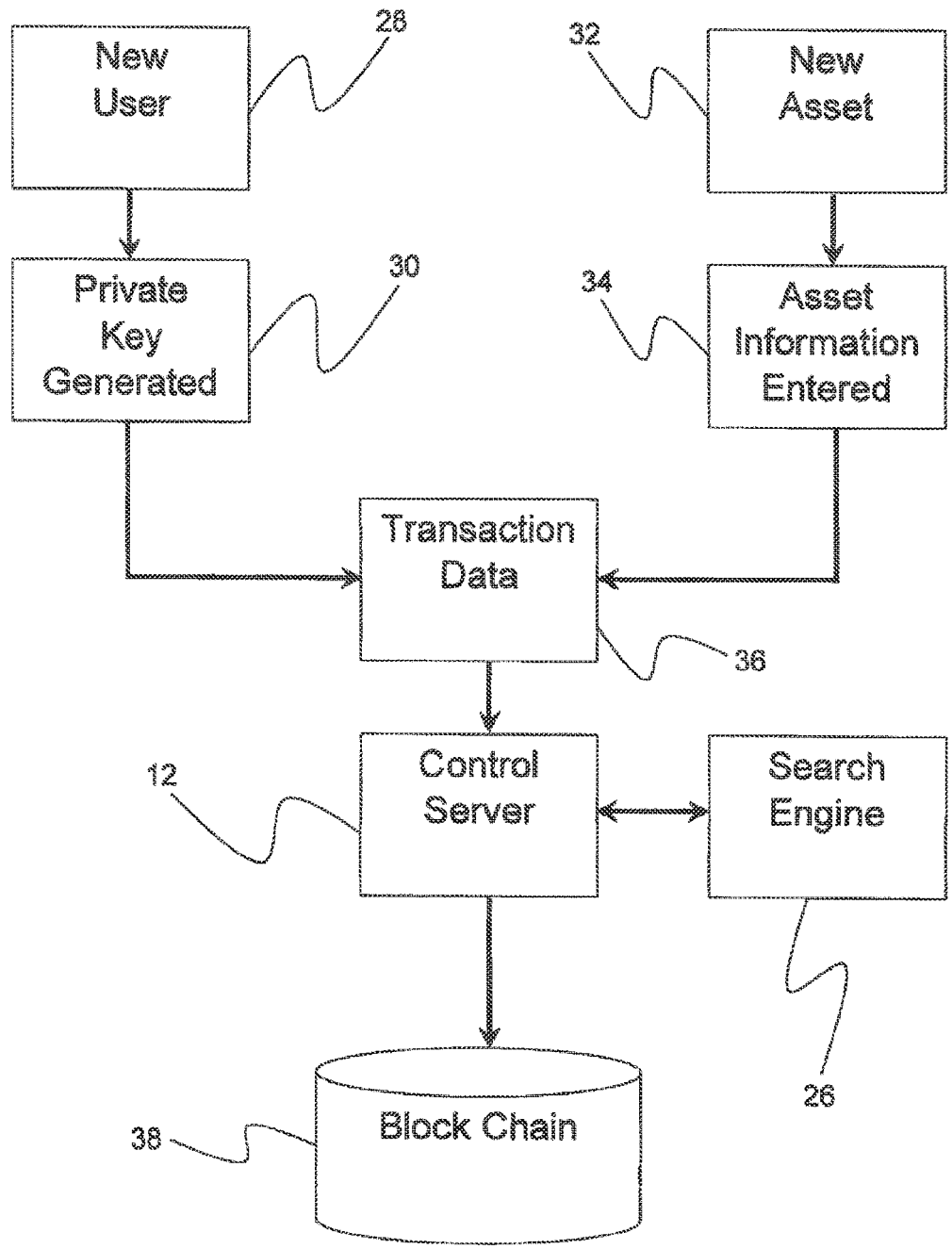
FIG. 7 is a diagram illustrating operational flow of registering and tracking an item according to an exemplary embodiment.

In one sense, the theft control function of the invention is a significant improvement over shopping center security systems in which RFID tags are attached to garments and other products, which must be removed prior to exiting the shop. Such a prior art system is described in EP 2 504 823 B1, granted Jan. 10, 2014, entitled ANTI-THEFT RFID SYSTEM AND METHOD THEREOF, the contents of which is incorporated by reference herein and relied upon. This is because it can compare scan results and identify changes, such as items that are no longer responding to the interrogation. This triggers an interrogation of the inventory management database of the seller in order to identify whether the items has been sold or not. Referring to FIG. 7, operations 28 and 30 are performed when a new user initially sets up their account through a customer user device 16a-16h, in which a private key specific to that user is generated. In operations 32 and 34, a new asset and identifying information to be added to the block chain 22a-22n is entered through the customer user device 16a-16h. The asset information which is entered in operation 34 is then combined with the private key to encrypt the transaction data as a sub-portion of a transaction of the block chain at operation 36 which is recorded by control server 12. Control server 12 then publishes the transaction to block chain 22a-22n, 38. At this point, the encrypted sub-portion data (the more confidential transactional details) of the transaction of the block chain is only recoverable by the user with the use of their private key. Ownership information of the asset can be updated by the current or first owner, additional asset information can be added to the sub-portion data. When a user reports the asset as stolen or lost, the private key identifies the user and the particular transaction of the block chain to the control server 12. When control server 12 receives the lost or stolen notification, the block chain transaction is pulled from the block chain 38 and a public search record is published to the search engine 26 with asset identification information to be used by other users in assisting the identification of the owner of the lost asset.

Figure 8:
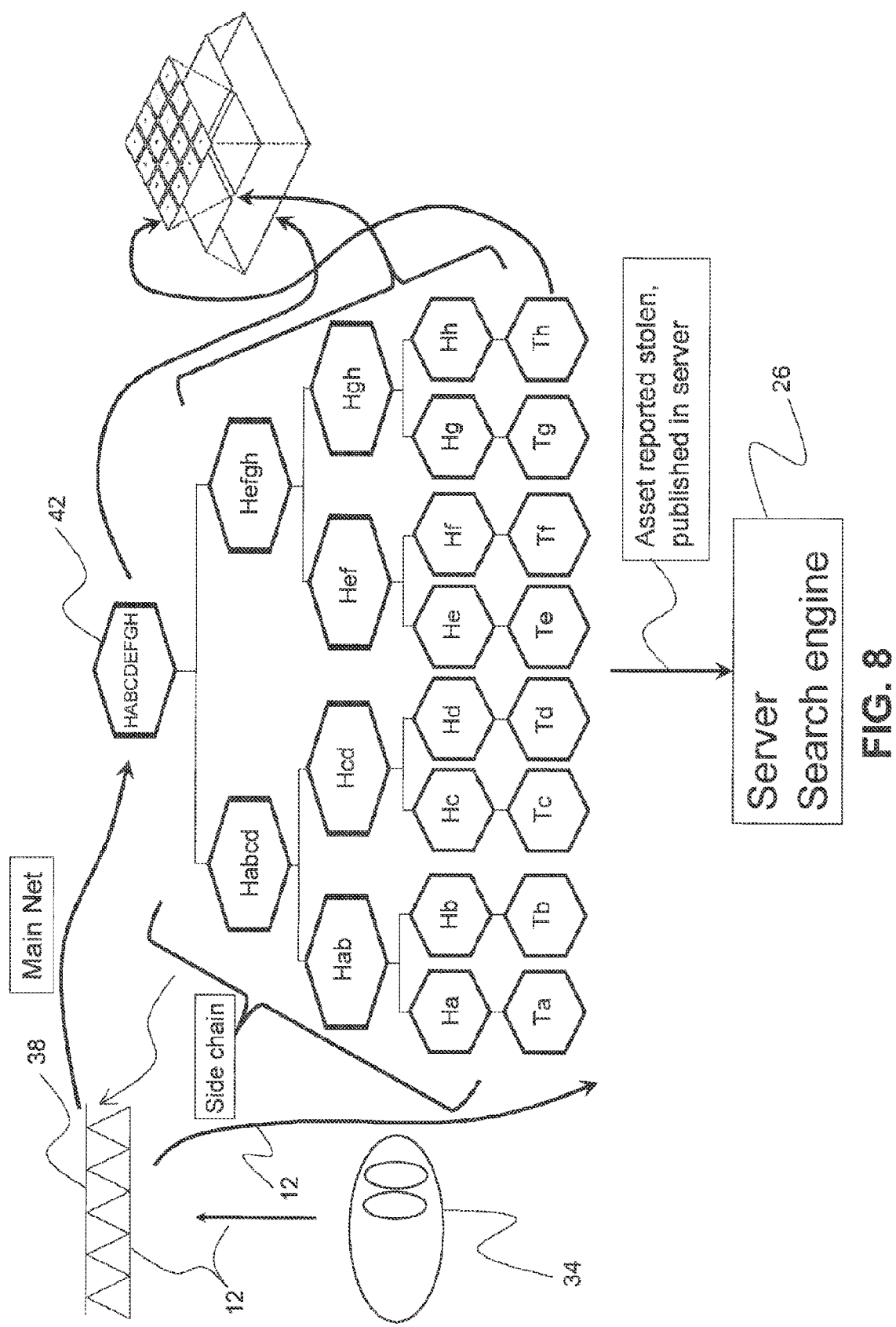
FIG. 8 is a diagram illustrating operational flow of item tracking and search according to an exemplary embodiment.

Referring to FIG. 8, in an exemplary embodiment, asset information 34 when entered through control server 12 may optionally be published as a part of a sidechain 40. The sidechain is managed by control server 12 to reduce traffic on the block chain 38 as well as increase performance and speed while keeping costs of updating block chain 42 on the primary block chain 38 to a minimum. The use of the sidechain allows for increased security of the encrypted asset and user information private while allowing for a decentralized ledger on block chain 38 to be maintained. Different sidechains may be used depending on the value of the assets, and so may offer users a level of security commensurate with registered asset value.

Found Item

The invention allows anyone to report a "found item" by describing the item by some characteristics such as product code or ID, type of product, brand, photo, location found, etc. The invention search engine searches the appropriate records for closest matches and reports to the finder and automatically generates a notification to the potential owner. Where the item has not been reported lost or stolen, the system of the invention informs the currently registered owner. As an incentive for other users to use the search engine 26 to report and locate a stolen or lost asset, rewards from the user 28 can be input into the system of the invention and set using smart contracts or other such desirable methods. For example, a finder's fee can be posted with the asset information 34 when published to the search engine 26 to provide an incentive to report a found asset to locate the user 28 who is listed as the current owner through the system 11. Such finder's fees can be pre-paid by the owner so that the reward will be available for payout upon return of the missing item. The invention allows anyone to report "item found" by describing the item by some characteristics such as type of product, brand, photo, location found etc. The invention's search engine searches the appropriate records for closest matches and reports to the finder and automatically generates a notification to the potential owner(s)

Note that the system of the invention can also be used to locate items that have sentimental value, years after these items were sold by a registered user. What is particularly useful here is the current owner information, which, if the current owner allows it, can be used by a prior owner (or person who has contact with a prior owner) to track the whereabouts of an item and to make a purchase offer on the item. This can be of particular value for collectors. In addition, the invention's ability to facilitate the location of items by serial number provides the manufacturers with a way to contact current owners with updated warning, recall or repair, as well as periodic service notices.

Change of Ownership

Figure 9:
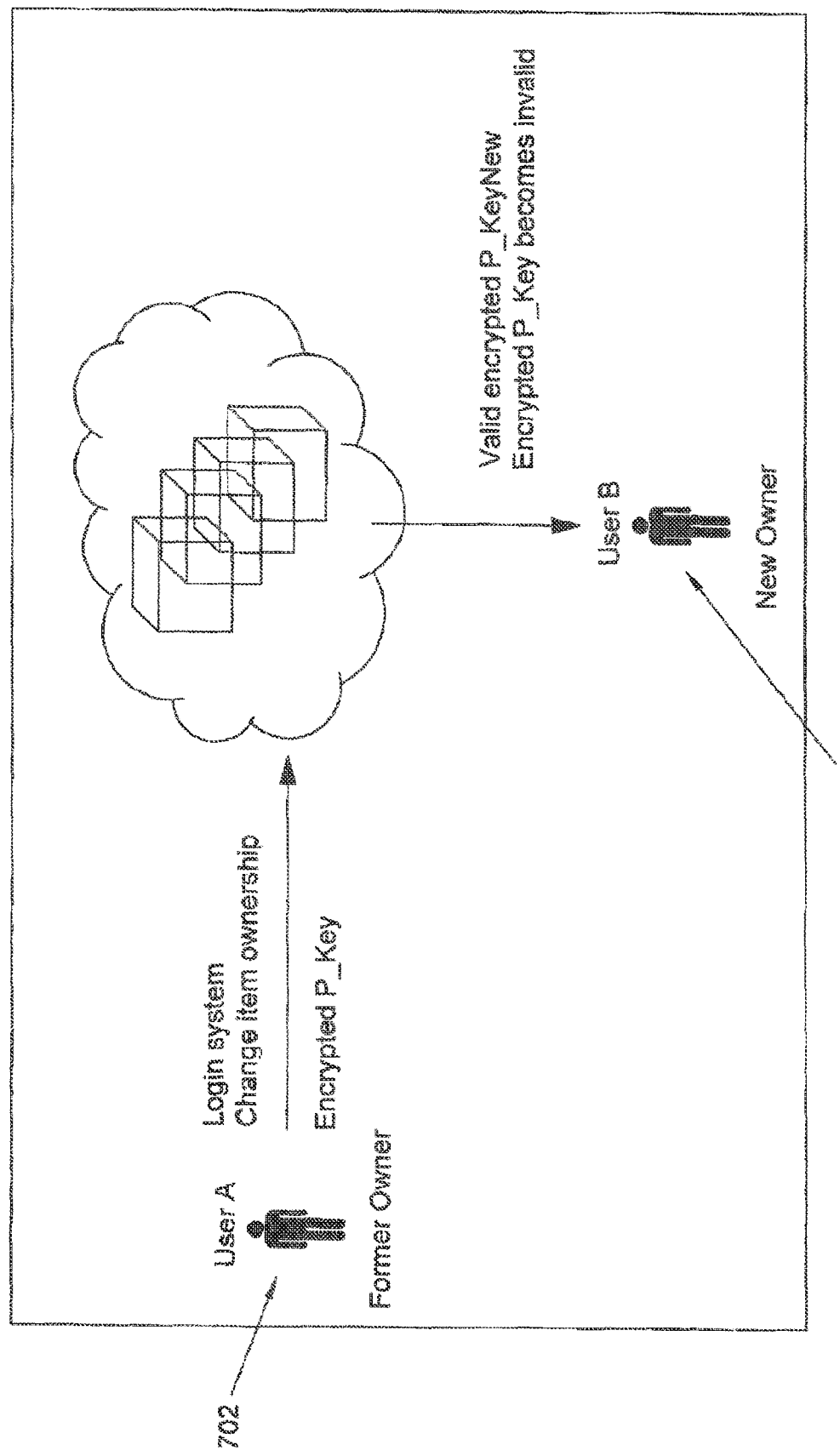
FIG. 9 is schematic diagram showing the process of changing ownership of an item.

Referring now to FIG. 9, in case of ownership transfer from original owner (user A) 702 to new owner (user B) 704, user A has to login to the system. In order to change the ownership, the P_Key, provided by the seller either by email or, for example, by providing a datastick with the P_Key loaded on it. The P key has to be entered. Once confirmed, user A, 702, can transfer ownership to user B, 704, by uploading proof of new ownership. Once entered and confirmed, active P_Key will become invalid and a new P KeyNew will be generated and sent to the new owner user B 704.

In addition, the invention includes a rule that once a change of ownership of a product has taken place, the previous owner 702 has to report this to the centralized database using a website or a mobile app, so that the new owner 704 of the item is recorded in the block chain. This is done by generating a new private key for the ownership transfer.

Report Fraud

Reporting fraud is similar to "Found item" with the addition to report potential criminal intentions by selling the item by a suspicious person.

Another aspect of the invention attempts to avoid fraud perpetrated on the system. In addition, when a registered owner reports an item lost or stolen and later a new owner enters the correct P key for the item, a flag for fraud perpetuated by the former owner is generated assuming that the former owner is attempting to recover an item as lost or stolen even though he has sold the item. Note however that the system of the invention incorporates a rule that automatically prevents the prior owner (once the new owner has been registered as the owner of the item) from reporting an item lost or stolen by denying him or her to power to make this report. However, the new owner must typically register in order to deny the former owner the power to make these status entries in the database.

The system of the invention will automatically notify affected parties about fraudulent claims and untrue statements will be flagged for prosecution under applicable law.

The system 11 of the invention helps guarantee that parts or ingredients of any finished product are genuine and any machinery (such as an airplane) uses authentic parts and not counterfeit or minor produced parts for repair. The system 11 of the invention acts as a certification authority that every product, which is recorded in the centralized database is an original.

Once an item has been registered to the centralized database of the invention which includes information about proof of ownership, ownership transfer in any form i.e. a printed invoice, and/or an ownership certificate or similar documents stating legit ownership, it is automatically transferred into the centralized and block chain based system and available via the search engine function of the invention. If scannable documents to proof legit ownership are not available, the user is asked via a dialog box of the invention to sign a disclaimer and submit the same through the website of the invention, thereby making this statement available as confirmation of this fact. In case of an untrue statement, the user is warned that they may be prosecuted by any applicable law.

As an accessory to the system 11 of the invention which facilitates identification, the system prints out a scannable ID sticker including a hologram of the purveyors of the invention, a barcode or a link on which information about the item can be found. This sticker is then attached to the item on an available, preferably exposed surface, preferably using permanent adhesive to make removal difficult. A 2D barcode may optionally be included which when scanned using the app of the invention, automatically opens up information in a smartphone or other computer about the item, the system of the invention providing a menu selection enabling the user to select the action they wish to perform, such as register the asset or report asset lost or stolen. An item that has been reported lost or stolen may add an alias to the URL such that when the 2D barcode is scanned, instead of opening up the opening page of the website, opens up a webpage warning that such item has been reported lost or stolen after which the lost and found reporting form is opened up automatically, thus greatly facilitating the purchase of legitimate goods by enabling the quick identification of problematic goods. Optionally, the system of the invention prints out more than one sticker, one of which is encoded as a label only (providing information only) and thus not allowing for registration of ownership, but is intended to be attached to the exterior of a gift so that, using the scanner of the invention, the contents of the gift can be identified without requiring opening of the packaging.

In another embodiment, the ID sticker can be a programmable passive RFID tag, optionally also having a 2D barcode label attached thereto, the tag being programmable in write only mode. Such a tag can be attached even to assets that have no tag or those what have been purchased second hand. If the serial number, when integrated into the ID sticker and when scanned or entered into a form which checks the serial number against the database of the invention or against one of the manufacturer (or both) does not indicate conflicting data, then this ID sticker may be added to any asset by anyone to begin the process of tracking the asset.

Figure 10:
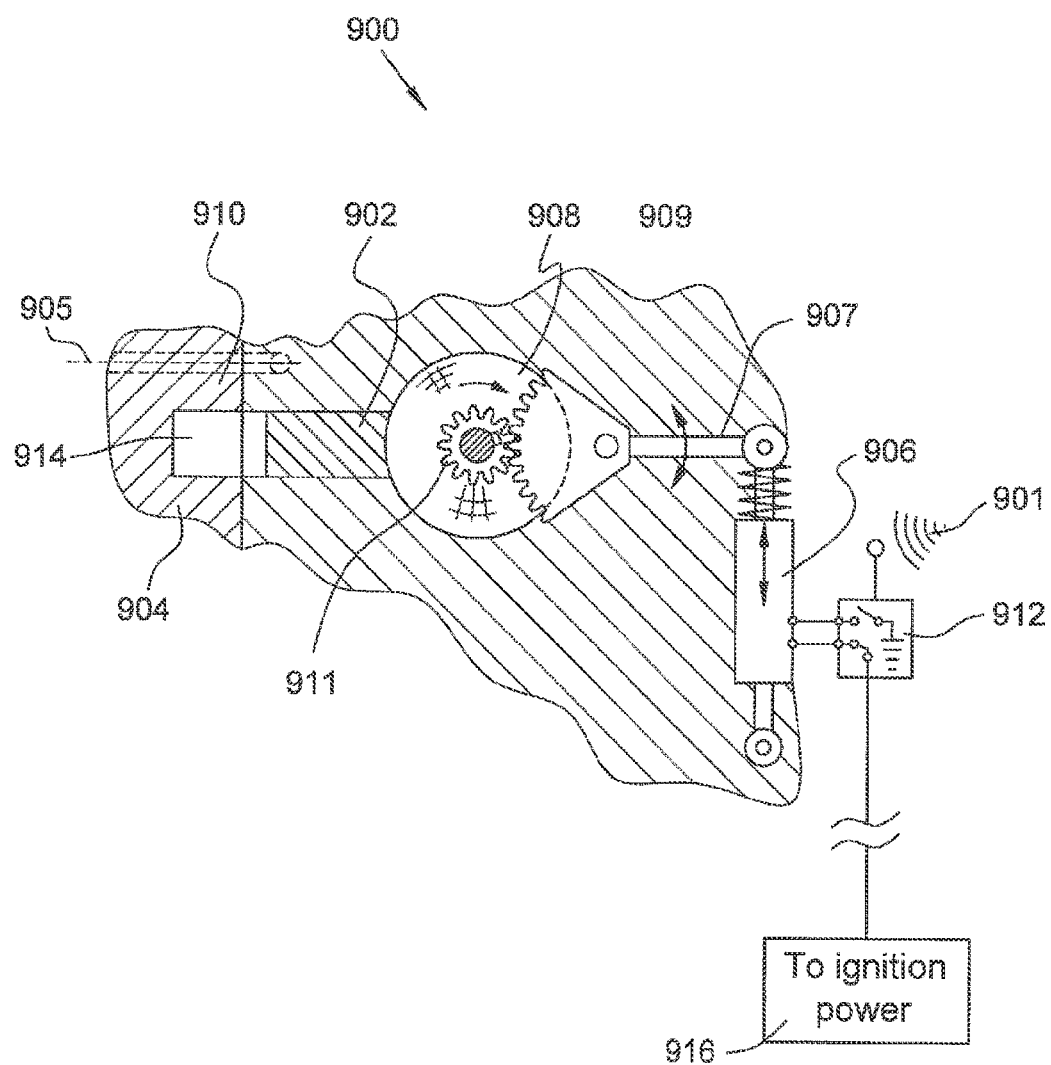
FIG. 10 is a schematic diagram of another embodiment of the invention.

Referring now to FIG. 10, in another embodiment, the system 11 of the invention may be used to facilitate gun or motor vehicle owner identification in jurisdictions where the ownership of such items must be registered. A firearm or ignition key disabling device or steering locking device 900 such as shown may be added to firearms or motor vehicles such that the system of the invention may automatically disable the item upon receipt, by the system of the invention, of a "lost or stolen" status indication, such status being broadcast (optionally only periodically) by radio waves 901 on a free radio channel set aside for this purpose. When broadcast periodically, and even over a short distance, such broadcasts are effected at, for example, sensitive locations such as banks, gas stations and other areas where gun violence or theft may be perpetrated. The system 11 is typically embodied as the device 900 on a firearm or motor vehicle which, when the registered owner reports the item lost or stolen, disables the device 900 via radio waves which, in this embodiment, electromagnetically activate a linear motion generator 906 which in turn actuates a lever 907 attached to a rack 909 which then engages a gear 911. When the gear 911 rotates, a spherical magnet 908 changes its polarity with respect to a tumbler or plunger 902 (itself a magnet in this embodiment) that, depending on whether it is repelled or attracted by the spherical magnet 908, locks the trigger 904, preventing the arm from firing, or the motor vehicle from being started again. The trigger 904 in this embodiment is hinged on a pin 905 such that the lower portion pivots into and out of the page, and includes a locking recess 914 into which the plunger 902 can engage.

In the variant adapted to lock the steering wheel or the ignition of a motor vehicle, safety is an issue. The system 11 of the invention should not be able to disable the motor vehicle while it is being driven. Therefore, in one embodiment, so long as the motor vehicle's ignition 916 is power-on, switches in the wireless receiver 912 do not apply power to active the linear motion generator 906, thereby preventing locking by the plunger 902. In this exemplary embodiment, an electromagnet (not specifically shown) in the linear motion generator 906 is activated to rotate the spherical magnet 908 which is abuttable against the magnetic plunger or tumbler 902 and so changes the state of these magnets from attract to repulsion (and vice versa), thereby moving the plunger or tumbler 902 in a receptacle 910 in which it slides to either lock or lock the firearm or motor vehicle. By broadcasting and activating the device 900 by wireless signals, the system of the invention may prevent violence before it occurs or aid a user recover the lost item In an advantage, the system allows one to register an item in a convenient and secure manner such that it can be identified in the event it is lost or stolen and then found.

In another advantage, the system enables ready scanning of items to determine whether an item has been misplaced or stolen.

In another advantage, the system provides incentive to those who have found a registered item to return the item to its rightful owner.

In another advantage, the system of the invention provides means for conveniently labeling product for ease of subsequent identification or tracking.

In another advantage, the potential of a successful fraud in minimized.

In another advantage, ownership changes are readily recorded such that there is more confidence that the seller has the right to sell an item.

In another advantage, dangerous devices may be disabled once such a device is reported lost or stolen.

In another advantage, the system allows items to be tracked, and their status updated through their life cycle.

In another advantage, the system allows a purchaser of an item to have confidence that the item is not a counterfeit.

Many industrial applications of the present invention may be formulated. One skilled in the art will appreciate that the network may include any system for exchanging data, such as, for example, the Internet, an intranet, an extranet, WAN, LAN, wireless network, satellite communications, and/or the like. It is noted that the network may be implemented as other types of networks, such as an interactive television network. The users may interact with the system via any input device such as a keyboard, mouse, kiosk, personal digital assistant, handheld computer, cellular phone and/or the like. Moreover, the system contemplates the use, sale and/or distribution of any goods, services or information having similar functionality described herein.

As will be appreciated by skilled artisans, the present invention may be embodied as a system, a device, or a method.

The present invention is described herein with reference to block diagrams, devices, components, and modules, according to various aspects of the invention. Moreover, the system contemplates the use, sale and/or distribution of any goods, services or information having similar functionality described herein.

The specification and figures should be considered in an illustrative manner, rather than a restrictive one and all modifications described herein are intended to be included within the scope of the invention claimed. Accordingly, the scope of the invention should be determined by the appended claims (as they currently exist or as later amended or added, and their legal equivalents) rather than by merely the examples described above. Steps recited in any method or process claims, unless otherwise expressly stated, may be executed in any order and are not limited to the specific order presented in any claim. Further, the elements and/or components recited in apparatus claims may be assembled or otherwise functionally configured in a variety of permutations to produce substantially the same result as the present invention. Consequently, the invention should not be interpreted as being limited to the specific configuration recited in the claims.

Hyperledger Sawtooth or other block chain API (see above for a listing of other options) may be used. For a full architectural description of Hyperledger Fabric, see hyperiedger-fabric.readthedocs.io/en/release-i A/arch-deep-dive.htmi.

Benefits, other advantages and solutions mentioned herein are not to be construed as critical, required or essential features or components of any or all the claims.

As used herein, the terms "comprises", "comprising", or variations thereof, are intended to refer to a non-exclusive listing of elements, such that any apparatus, process, method, article, or composition of the invention that comprises a list of elements, that does not include only those elements recited, but may also include other elements such as those described in the instant specification. Unless otherwise explicitly stated, the use of the term "consisting" or "consisting of" or "consisting essentially of" is not intended to limit the scope of the invention to the enumerated elements named thereafter, unless otherwise indicated. Other combinations and/or modifications of the above-described elements, materials or structures used in the practice of the present invention may be varied or adapted by the skilled artisan to other designs without departing from the general principles of the invention.

The patents and articles mentioned above are hereby incorporated by reference herein, unless otherwise noted, to the extent that the same are not inconsistent with this disclosure. Other characteristics and modes of execution of the invention are described in the appended claims.

Further, the invention should be considered as comprising all possible combinations of every feature described in the instant specification, appended claims, and/or drawing figures which may be considered new, inventive and industrially applicable.

Additional features and functionality of the invention are described in the claims appended hereto. Such claims are hereby incorporated in their entirety by reference thereto in this specification and should be considered as part of the application as filed.

Multiple variations and modifications are possible in the embodiments of the invention described here. Although certain illustrative embodiments of the invention have been shown and described here, a wide range of changes, modifications, and substitutions is contemplated in the foregoing disclosure. While the above description contains many specific details, these should not be construed as limitations on the scope of the invention, but rather exemplify one or another preferred embodiment thereof. In some instances, some features of the present invention may be employed without a corresponding use of the other features. Accordingly, it is appropriate that the foregoing description be construed broadly and understood as being illustrative only, the spirit and scope of the invention being limited only by the claims which ultimately issue in this application.

The invention claimed is:

1. A computerized method including software having instructions for executing the method, the instructions loaded on a computer system having functional components including a CPU, memory including a database populated with item information associated with owner, leasee and/or lien holder information, and communications interfaces for operably interconnecting the functional components, the CPU executing the instructions, wherein further, the method includes instructions for:
   a) registering users as owners, leasees and/or lien holders of items for which information is to be included in the database, then
      associating an item with each of the registered users and populating the database with item information in association with each of the registered users, such users being classified according to one of a group of classifications consisting of at least owners, leasees and lien holders, and storing such item information in the database including information stored on a distributed ledger, the item information including at least stolen status, lost and found status together with any reward information; and then
      making the registered item information available for updating or interrogation by users based on permissions, the step of making the item information available for updating or interrogation by users based on permissions comprising:
         allowing the owners, leasees and lien holders, when an associated menu selection is made, to search for an item and report their associated items as lost, found, encumbered and stolen to cause a change to the database; and
   b) registering members of the general public in association with limited access rights to the database, which members of the general public are not owners, leasees or lien holders of items for which information is included in the database, whereby members of the general public are registered differently than owners, leasees and lien holders of items for which information is included in the database; and
      the step of making the item information available for updating or interrogation by users based on permissions further comprising allowing the members of the general public to view basic item information and the lost, stolen or lien status of the item and thereby determine the lost, stolen or lien status of an item in the database.

2. The method of claim 1, wherein when an item is reported as lost or stolen by the registered item owner, the method further comprises enabling uploading of or associating the report with a police report or police file number.

3. The method of claim 1, further comprising enabling a user with the associated permissions to store additional item information selected from one of a group of information types consisting of identification information, warranty information, ownership information, proof of ownership, recall status, maintenance history, end of life information, serial number, manufacture information, product description, item location, and lien information in association with the item.

4. The method of claim 1, wherein the method allows connection to and query of the database by a user based on the access rights of the user or user classification, and if the user is classified as a member of the public with no superior use privileges, providing an interface to the user allowing the user to interrogate the status of an item in a limited way so as to allow the user to at least determine the lost, stolen or lien status of an item, and if the user is classified as having superior permissions, allowing the user to access the item information and to register an item as lost, found, encumbered, or stolen according to his permissions.

5. The method of claim 1, further comprising determining access rights using an ID protocol based on a query, rules and known item status.

6. The method of claim 5, wherein the ID protocol checks an account of the user to see if items are registered as being owned by the user and if so, provides the user with access to an account manager interface allowing the user to manage the items in their account.

7. The method of claim 1, further comprising allowing users with the necessary permissions to search for and identify an item using a mobile device or any other computer system by entering search parameters including one of type, brand, serial number, and QR code in order to verify an item status as "good", "lost" or "stolen".

8. The method of claim 1, further comprising allowing a user with required permissions to change an item status to "repair/maintenance", "end of life", "defect", or "destroyed".

9. The method of claim 1, wherein the item is a physical item selected from a group of physical items consisting of a wristwatch, jewelry, hardware, artwork, a musical instrument, and a motor vehicle.

10. The method of claim 1, further comprising storing data in the database on the cloud.

11. The method of claim 1, further comprising storing data in the database at least in part on a side chain.

12. The method of claim 1, wherein the method is executed on a system including a control server, one or more trusted partner servers, and one or more customer user devices.

13. The method of claim 1, wherein the system includes a plurality of control servers.

14. The method of claim 12, further comprising connecting components of the system via at least one of a network, any combination of local area networks and wide area networks which communicate over TCP/IP.

15. The method of claim 13, wherein at least one of the plurality of control servers and any trusted partner servers run instances of software enabling the distributed ledger block chain for secure data storage.

16. The method of claim 1, wherein, when the computer system receives a notice from a registered owner or leasee that an item having a radio-controlled disabling device incorporated therein has been lost or stolen, the system sends out a radio signal initiating disablement of the item.

17. The method of claim 1, wherein the distributed ledger is a block chain selected from one of the list of block chains consisting of the ETHEREUM™ block chain, the HYPERLEDGER™ block chain, HYPERLEDGER FABRIC™ block chain, a public block chain, a private block chain, a federated block chain, a permissioned block chain, and an unpermissioned block chain.

18. The method of claim 1, wherein the step of making the registered item information available for updating or interrogation by users based on permissions comprises:
   making the registered item information available to the owners, leasees and lien holders for updating only their associated items based on permissions associated with each of the owners, leasees and lien holders; and
   making the registered item information available to registered members of the general public only for interrogation based on permissions associated with each of the members of the general public.

\* \* \* \* \*

UNITED STATES PATENT AND TRADEMARK OFFICE
CERTIFICATE OF CORRECTION

| | |
|---|---|
| PATENT NO. | : 11,681,815 B2 |
| APPLICATION NO. | : 17/058174 |
| DATED | : June 20, 2023 |
| INVENTOR(S) | : Arman Sarhaddar and Martin Beyer |

It is certified that error appears in the above-identified patent and that said Letters Patent is hereby corrected as shown below:

In the Claims

Claim 1:
Column 15, Line 24, after "making the", delete "registered".

Signed and Sealed this
Eighteenth Day of July, 2023

Katherine Kelly Vidal
*Director of the United States Patent and Trademark Office*